(12) United States Patent
Diez et al.

(10) Patent No.: US 6,250,644 B1
(45) Date of Patent: Jun. 26, 2001

(54) CYLINDER HEAD GASKET

(75) Inventors: Armin Diez, Lenningen; Ulrich Staib, Nürtingen; Peter Schweizer, Kohlberg; Martin Biedermann, Dettingen, all of (DE)

(73) Assignee: Elring Klinger GmbH, Dettingen (DE)

( * ) Notice: Subject to any disclaimer, the term of this patent is extended or adjusted under 35 U.S.C. 154(b) by 0 days.

(21) Appl. No.: 09/255,159

(22) Filed: Feb. 22, 1999

(30) Foreign Application Priority Data

Feb. 28, 1998 (DE) .............................................. 198 08 544

(51) Int. Cl.$^7$ ...................................................... F02F 11/00
(52) U.S. Cl. ................................................................ 277/595
(58) Field of Search ................................... 277/591, 592, 277/593, 594, 595, 598

(56) References Cited

U.S. PATENT DOCUMENTS

| | | | |
|---|---|---|---|
| 4,468,044 | * | 8/1984 | Ulmer et al. ...................... 277/593 X |
| 4,739,999 | | 4/1988 | Ishii et al. . |
| 4,759,556 | | 7/1988 | Udagawa . |
| 5,560,623 | | 10/1996 | Yoshino . |
| 5,609,345 | * | 3/1997 | Miura et al. ........................... 277/593 |
| 5,639,101 | | 6/1997 | Tanaka et al. . |

FOREIGN PATENT DOCUMENTS

| | | |
|---|---|---|
| 2343311 A1 | 3/1975 | (DE) . |
| 3306759 A1 | 11/1983 | (DE) . |
| 19539245 C2 | 9/1997 | (DE) . |
| 0230804 B1 | 6/1990 | (EP) . |
| 0433530 B1 | 1/1993 | (EP) . |
| 0518665 B1 | 4/1996 | (EP) . |
| 0717218 A1 | 6/1996 | (EP) . |
| 0518664 B1 | 4/1997 | (EP) . |
| 0590944 B1 | 12/1997 | (EP) . |
| 2 526 912 | 11/1983 | (FR) . |
| 59-226763 | 12/1984 | (JP) . |
| 62-261761 | 11/1987 | (JP) . |
| 2-129468 | 5/1990 | (JP) . |
| 4-191569 | 7/1992 | (JP) . |
| 5-44845 | 2/1993 | (JP) . |

* cited by examiner

*Primary Examiner*—Anthony Knight
*Assistant Examiner*—Karlena D. Schwing

(57) ABSTRACT

Cylinder head gasket with a gasket plate which has several metal layers placed on top of one another, at least one combustion chamber aperture as well as at least one fluid aperture and is provided with a combustion gas sealing system around the combustion chamber aperture as well as with a fluid sealing system around the fluid aperture, wherein two external metal layers (outer layers) of the gasket plate enclose between them at least one inner metal layer (inner layer) of the gasket plate and at least one of the metal layers has at least one bead surrounding the fluid aperture; in order to be able to produce such a cylinder head gasket as simply as possible and at the same time minimize the risk of the sealing surfaces of engine block and cylinder head being impaired by the cylinder head gasket, such a cylinder head gasket is designed such that (a) the bead surrounding the fluid aperture is provided on an inner layer and the latter is such a spring-steel sheet metal layer that its bead is stressed predominantly in the elastic range when the gasket is fitted;

Figure 1:
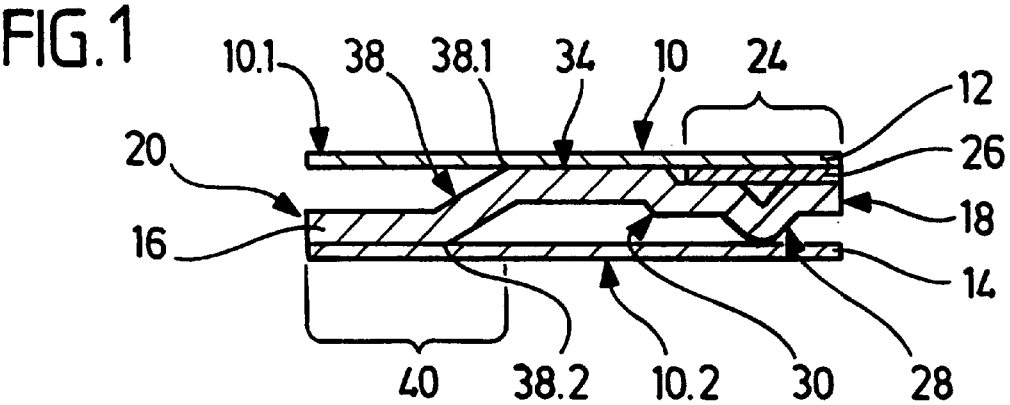

(b) the bead of the inner layer is a semi-bead with an approximately Z-shaped cross section, and (c) the outer layers are designed over the entire main surfaces of the gasket plate as smooth and flat sheet-metal layers and form these main surfaces.

10 Claims, 2 Drawing Sheets

CYLINDER HEAD GASKET

The present disclosure relates to the subject matter disclosed in German Application No. 198 08 544.3 of Feb. 28, 1998, the entire specification of which is incorporated herein by reference.

The invention relates to a so-called metal-layer cylinder head gasket, the gasket plate of which is formed by at least three layers, namely by two external metal layers (referred to in the following as outer layers) and at least one inner layer arranged between these outer layers. The invention relates, in particular, to cylinder head gaskets of this type for commercial vehicle engines.

The gasket plate of such a cylinder head gasket has one or more combustion chamber apertures as well as one or more fluid apertures for the passage of lubricants and/or coolant and is provided with a combustion gas sealing system around the combustion chamber aperture as well with a fluid sealing system around the fluid aperture. In the case of current metal-layer cylinder head gaskets, the combustion gas sealing system is formed by a full bead (i.e. a bead with an approximately U-shaped cross section) of an inner layer of the gasket plate, this bead surrounding the combustion chamber aperture, by the edge regions of the two outer layers of the gasket plate covering this bead and extending around the combustion chamber aperture as well as by a combustion chamber border; the latter is either a sheet-metal strip, which is approximately C-shaped in cross section, extends around the combustion chamber aperture and engages over the specified edge regions of the outer layers as well as the bead of the inner layer, or a free edge strip of the one outer layer, which extends around the combustion chamber aperture and has been folded through 180° such that it engages over the edge region of the other outer layer surrounding the combustion chamber aperture as well as the bead of the inner layer. In order to form the fluid sealing system the outer layers of the current metal-layer cylinder head gaskets are provided with beads which surround the relevant fluid aperture and are supported, on the one hand, (when the gasket is fitted) against the adjacent sealing surface of the cylinder head or engine block and, on the other hand, against an inner layer of the gasket plate. Beads provided in the outer layers at a distance from the combustion chamber apertures do, however, result in disadvantages:

During operation of the engine, so-called vertical sealing gap movements occur, i.e. the size of the gap between the sealing surface of cylinder head and engine block accommodating the cylinder head gasket is not a constant size during operation of the engine, and these vertical sealing gap movements are all the greater, the greater the distance of the location of the sealing gap under consideration from the cylinder head bolts. This does not, however, apply for the areas of the gasket plate immediately bordering on the combustion chamber apertures since metal-layer cylinder head gaskets are dimensioned in the area of the combustion gas sealing systems such that the greatest, specific surface pressures occur there in any case in order to prevent leakages being able to occur between the cylinder head gasket and the cylinder head or the engine block in these areas during operation of the engine. A bead, which is used in an outer layer of a metal-layer cylinder head gasket for sealing a fluid aperture and is intended to seal in a fluid-tight manner when a gasket is installed (i.e. when this is clamped between cylinder head and engine block) on account of its elastic spring-back resilience capability, does, however, lead to vertical sealing gap movements resulting in horizontal displacement movements between the bead and the cylinder head or the engine block. This also applies for so-called semi-beads (beads with a cross section which is similar to a Z or an S lying on its side) which are preferred for sealing fluid passages in the case of cylinder head gaskets for modern engines since a semi-bead requires less space (measured in the plane of the gasket plate transversely to the longitudinal extension of the bead) than a full bead and often very little space is available between the apertures in these engines. The result of these horizontal displacement movements is channels worn into the sealing surfaces of cylinder head and engine block, even when these engine components do not consist of a light-metal alloy but cast iron. In this connection, it must be borne in mind that the areas of contact between the beads and the sealing surfaces of motor engine and cylinder head, which bring about the sealing effect, have a more or less linear configuration and in these areas of contact relatively high, specific surface pressures exist which lead to appearances of wear and tear on the sealing surfaces of engine block and cylinder head, i.e. to the channels mentioned, when the horizontal displacement movements described above occur. Channels of this type do, however, result not only in the disadvantage that leakages can occur because a stationary state cannot be attained in the specified areas of contact during operation of the engine but also during replacement of the cylinder head gasket the sealing surfaces of cylinder head and engine block must always be machined in order to remove these channels and again provide absolutely flat sealing surfaces.

Unevenness, namely indentations in the sealing surfaces of cylinder head and engine block, which have to be eliminated during replacement of the cylinder head gasket by way of machining the sealing surfaces, also result, however, from the combustion chamber borders, which are C-shaped in cross section, of the known metal-layer cylinder head gaskets described above since, as already mentioned, the specific surface pressures around the combustion chamber apertures of the cylinder head gaskets are particularly great.

The object underlying the invention was to provide a metal-layer cylinder head gasket, with which it is possible to reduce or even eliminate those problems which are caused during use of the known cylinder head gaskets described above due to alterations in the sealing surfaces of engine block and cylinder head, and, where applicable, even in the case of those engines, in which the engine block is provided with liners, the upper end faces of which form parts of the sealing surface of the engine block.

The invention is based on a cylinder head gasket with a gasket plate which has several metal layers placed on top of one another, at least one combustion chamber aperture as well as at least one fluid aperture and is provided with a combustion gas sealing system around the combustion chamber aperture as well as with a fluid sealing system around the fluid aperture, wherein two external metal layers (outer layers) of the gasket plate enclose between them at least one inner metal layer (inner layer) which has a bead which surrounds the fluid aperture and is supported against two adjacent metal layers when the gasket is fitted.

Such a cylinder head gasket is designed in accordance with the invention to accomplish the set object such that
(a) the inner layer is such a spring-steel sheet metal layer that its bead is stressed at least predominantly in the elastic range when the gasket is fitted and thus can compensate for vertical sealing gap movements essentially by way of its spring-back resilience properties;
(b) the bead is a semi-bead forming a closed ring with a cross section similar to a step or approximately Z-shaped (or a cross section similar to an S lying on its side), and (c) the outer layers are designed over the two entire main surfaces of the gasket plate as smooth and flat sheet metal layers and form these main surfaces.

In the case of an inventive cylinder head gasket, the fluid-tight sealing around a fluid aperture does not take place between the bead of the fluid sealing system and the sealing surface of the cylinder head or engine block but between this bead and the adjacent metal layer of the cylinder head gasket, and the horizontal displacement movements described above also occur at this point during operation of the engine and so these cannot lead to any impairment of the quality of the sealing surface of cylinder head or engine block. Furthermore, the metal layer covering the bead results in the fact that the "peak" of the specific surface pressure at the boundary surface between cylinder head gasket and sealing surface of the cylinder head or engine block, this peak being caused by the bead and occurring in its region, is somewhat "leveled off" and, consequently, the risk of indentations resulting in this sealing surface during operation of the engine is reduced. Also, the surface roughness of that metal layer, against which the bead is supported, is in general considerably less than the surface roughness of the sealing surface of cylinder head or engine block and so the bead is stressed by the unavoidable horizontal displacement movements considerably less than in the case of the known metal-layer cylinder head gaskets described and, consequently, is subjected less to the risk of fatigue fractures. Since the outer layers of the inventive cylinder head gasket are smooth and flat, and also around the combustion chamber aperture, the risk of the combustion gas sealing system leading to damaging indentations in the sealing surfaces of cylinder head and engine block is also at least minimized, if not even eliminated, at these points. Since metal layers provided with beads require the use of specific materials for these metal layers, in the case of inventive cylinder head gaskets the metal layers provided with beads are, however, located in the interior of the gasket plate, the invention also makes an optimum pairing of materials possible between the two main surfaces of the gasket irrespective of the materials of the cylinder head and the engine block.

It is often necessary to provide the two main surfaces of a metal-layer cylinder head gasket with a coating, as a result of which the micro-sealing between the cylinder head gasket and the sealing surfaces of engine block and cylinder head is improved—since these two engine components (and also the liners) are castings, pores or even cavities in these sealing surfaces cannot be avoided completely and with absolute certainty, and a seal can often be brought about at these faulty points of the sealing surfaces only with such coatings. Since the inventive cylinder head gasket allows completely flat metal sheets to be used for its outer layers, sheet material may be used for the outer layers which may be provided in a simple and therefore inexpensive manner with a coating over the entire surface, e.g. by rolling on a thin layer consisting of an elastomeric material.

Corrosion phenomena occurring on the two main surfaces of the gasket plate during operation of the engine or during storage of metal-layer cylinder head gaskets may be avoided in a simple and particularly inexpensive manner by way of the roller coating mentioned above—a roller coating over the entire surface is much cheaper than a partial coating, e.g., in a screen printing process or a coating over the entire surface due to spraying or pouring on of the coating material, as is required in the case of outer layers provided with beads.

Finally, the smooth outer layers of inventive cylinder head gaskets facilitate the use of cheap materials for these outer layers in comparison to spring steel.

The state of the art does not provide any example for the combination of features of the inventive cylinder head gasket described above:

U.S. Pat. No. 4,759,556 does disclose a metal-layer cylinder head gasket (cf. FIGS. 4 and 5 therein), with which the fluid sealing system is formed around an oil aperture $H_o$ by outer layers smooth and flat in this area as well as a bead system 23, 24 of an inner layer; however, it is apparent from the illustration of the area of this cylinder head gasket surrounding a combustion chamber aperture $H_c$ in FIG. 4 of U.S. Pat. No. 4,759,556 that in the region of the combustion gas sealing system the two main surfaces of the gasket plate are not smooth and flat and so the basic principle of the present invention cannot be derived from this state of the art, namely to design the outer layers over the two entire main surfaces of the gasket plate as smooth and flat sheet-metal layers and thus also to avoid steps or other unevenness in the two main surfaces of the gasket plate around the combustion chamber apertures. Moreover, the beads of the inner layer in this known cylinder head gasket are designed as so-called full beads which cannot be compared with semi-beads with respect to the problems explained above and attributable to horizontal displacement movements: Semi-beads which are preferred to full beads for reasons of the space requirements discussed above are supported on both sides against the adjacent metal layer via a single, more or less linear area of contact and so approximately the same specific surface pressure is given in both areas of contact when a gasket is fitted whereas a full bead is supported against the adjacent metal layers, on the one side via one and on the other side via two more or less linear areas of contact with the result that along these areas of contact the specific surface pressure on the one side is only half as great as on the other side.

In this connection, it is pointed out that the present invention is not limited to embodiments, with which for forming a fluid sealing system an inner layer has only one single semi-bead surrounding the fluid aperture; this inner layer could, for example, also have two semi-beads which are concentric in relation to the fluid aperture and for which, of course, less room is likewise required overall than for two full beads. It also results from the above explanations that two semi-beads extending next to one another and parallel to one another and having a cross sectional configuration in mirror symmetry with respect to a center line extending between these semi-beads may not be equated with a full bead since two such semi-beads on both sides of the inner layer lead to two more or less linear areas of contact but a full bead on the one side only to a single more or less linear area of contact.

In preferred embodiments of the inventive cylinder head gasket, the bead of an inner layer is supported against the two outer layers or—when using two inner layers provided with beads—the beads are supported, on the one hand, against an adjacent outer layer and, on the other hand, against an adjacent inner layer. Fundamentally, it would, however, also be conceivable, of course, to provide an additional sheet-metal layer between an outer layer and an inner layer provided with a bead.

Where applicable, it may be expedient to provide the outer layers with a coating on their inner sides, especially with a rolled on coating over the entire surface, in order to achieve certain surface properties at this point.

For reasons of costs, as will result from the following, but also for reasons of production it may be advantageous to use for at least one of the two outer layers a material which has a lesser hardness than the inner layer provided with the bead. It may be recommendable, in particular, to use for at least one of the outer layers a relatively soft, cold broad strip sheet metal or a sheet metal consisting of an austenitic stainless steel, above all when the relevant outer layer is intended to be capable of being deep drawn.

In embodiments of the inventive cylinder head gasket which are particularly advantageous because they are simple to produce an inner layer has a bead which surrounds the combustion chamber aperture, is a part of the combustion gas sealing system and covered by the two outer layers which does not mean that the bead must be supported directly against the two outer layers. It is recommendable for the combustion gas sealing system to design this bead as a full bead approximately U-shaped in cross section.

In order to achieve a so-called combustion chamber superelevation, i.e. a particularly high, specific surface pressure around the combustion chamber aperture, the gasket of inventive cylinder head gaskets with combustion gas sealing systems which have beads is advantageously designed such that the sum of the material thicknesses of the metal layers around a combustion chamber aperture is greater in the area of the combustion gas sealing system than in areas of the gasket plate bordering on the latter. Two principle constructions are recommended for such embodiments:

For first embodiments the material thickness of the one, first outer layer is selected to be greater than the material thickness of the other, second outer layer and the construction is designed such that the first outer layer is folded through 180° around the combustion chamber aperture to form a border of this aperture approximately C-shaped in cross section such that a free edge strip of the folded region is located at least approximately in the plane of the second outer layer and covers the bead belonging to the combustion gas sealing system at least essentially.

Alternatively, the gasket can be designed such that the combustion gas sealing system has a sheet-metal ring covering its bead at least essentially and surrounding the combustion chamber aperture, this ring being borne by one of the external metal layers as well as extending adjacent to its inner side and parallel thereto. This sheet-metal ring can be a sheet-metal ring produced as a separate part by punching but embodiments are more advantageous, in which for forming the sheet-metal ring the outer layer associated with it is folded back upon itself through 180° around the combustion chamber aperture since this allows not only material to be saved as the waste resulting during punching out of a sheet-metal ring is avoided but the sheet-metal ring is also held in its precalculated position on the outer layer adjacent to it without any special measures and it may be produced in a simple manner during the punching out of the outer layer by means of a follow-on tool.

In the case of inventive cylinder head gaskets with more than three metal layers, the sheet-metal ring need not be borne by an outer layer or be formed on this but it can also be provided on one of the inner layers, as will be apparent from the embodiments illustrated in the attached drawings.

Additional features, advantages and details of the invention result from the following description as well as the attached drawings illustrating several, particularly advantageous embodiments of the inventive cylinder head gasket; FIGS. 1 to 6 show schematic cross sections through six embodiments, wherein only the area between a combustion chamber aperture and a fluid aperture is always shown—in all the Figures the combustion chamber aperture is located to the right and the fluid aperture to the left of the metal-layer areas shown.

Since the person skilled in the art is familiar with metal-layer cylinder head gaskets and cylinder head gaskets of this type have also been described in detail in patent literature and illustrated in the drawings (apart from in the U.S. Pat. No. 4,759,556 discussed above, e.g. in DE-A-23 43 311 as well as European patent specifications 0 590 944, 0 518 665 and 0 518 664), the details illustrated in the attached FIGS. 1 to 6 from cross sections through inventive cylinder head gaskets are sufficient for understanding the present invention.

FIG. 1 shows part of a gasket plate 10 of an inventive cylinder head gasket with two outer layers 12 and 14 as well as a single inner layer 16. A combustion chamber aperture has been designated as 18, a fluid aperture as 20, wherein only the areas of these apertures bordering on the illustrated area of the gasket plate 10 are apparent.

The outer layers 12 and 14 are designed in accordance with the invention as smooth and flat sheet-metal layers whereas the inner layer 16 is a profiled sheet-metal layer. This cylinder head gasket has around the combustion chamber aperture 18 a combustion gas sealing system 24 which surrounds the combustion chamber aperture annularly; one component of the combustion gas sealing system 24 is a sheet-metal ring 26 which, in the embodiment illustrated in FIG. 1, is intended to be a sheet-metal ring which is produced as a separate part by punching out, likewise surrounds the combustion chamber aperture 18 annularly and has been secured to the inner side of the outer layer 12 in a suitable manner, e.g. by way of spot-welding by means of a laser, wherein the laser beam has been directed against the sheet-metal ring 26 from below in accordance with FIG. 1.

The inner layer 16 has an annular full bead 28 with an approximately U-shaped cross section which surrounds the combustion chamber aperture 18, is part of the combustion gas sealing system 24 and covered by the sheet-metal ring 26. The inner layer 16 is bent at an angle—the bend has been designated as 30—radially somewhat outside the sheet-metal ring 26 with respect to the combustion chamber aperture 18, wherein the bend 30 extends in such a direction and the thickness of the sheet-metal ring 26, the height of the bend 30 and the height of the full bead 28 are coordinated with one another such that a surface area of the inner layer 16 designated as 34 abuts against the outer layer 12, with a cylinder head gasket installed, when the ridge of the full bead 28 is supported against the outer layer 14 and the sheet-metal ring 26 abuts against the inner layer 16 on both sides of the bead 28.

The inner layer 16 has a semi-bead 38 which surrounds the fluid aperture 20 annularly and is part of a fluid sealing system 40 surrounding the fluid aperture 20 annularly. The cross-sectional shape of the semi-bead 38 corresponds approximately to a Z, an S lying on its side or an inclined step, and when a cylinder head gasket is installed the inner layer 16 is supported on the two outer layers 12 and 14 in the region of the fluid sealing system 40 such that relatively high, specific surface pressures occur in more or less linear areas of contact 38.1 and 38.2 which enclose the fluid aperture 20 annularly, these surface pressures being higher than the specific surface pressures in the surface area 34 and in the surface area of the inner layer 16 adjoining the area of contact 38.2 to the left in accordance with FIG. 1.

In the area of the cylinder head gasket illustrated in FIG. 1, when the latter is clamped between cylinder head and engine block, the sealing takes place, on the one hand, between the main surfaces 10.1 and 10.2 of the gasket plate 10 and the adjacent sealing surfaces of cylinder head and engine block (not illustrated) and, on the other hand, in the interior of the gasket plate 10 around the fluid aperture 20 between the outer layers 12 and 14 as well as the areas of contact 38.1 and 38.2 of the inner layer 16 as well as around the combustion chamber aperture 18 between the dome of the full bead 28 and the outer layer 14 or between the sheet-metal ring 26 and the two "feet" or "roots" (which point upwards in FIG. 1) of the full bead 28. When the sheet-metal ring 26 is not connected in a gas-tight manner to the outer layer 12 because these two parts are not connected to one another by means of a continuous, annular and complete, gas-tight welding seam, the sealing takes place around the combustion chamber aperture 18, in addition, between the sheet-metal ring 26 and the outer layer 12.

The embodiments illustrated in FIGS. 2 to 6 are described in the following only insofar as they differ from the embodiment according to FIG. 1, and the same reference numerals as in FIG. 1 have been used in FIGS. 2 to 6, as far as possible, but with the addition of the letters "a" to "e".

Figure 2:
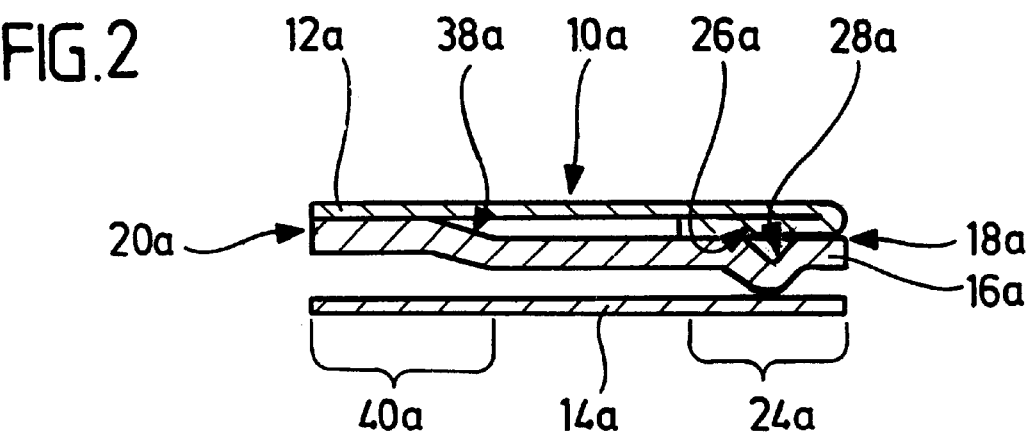

In the embodiment illustrated in FIG. 2, the bend 30 of the embodiment according to FIG. 1 is omitted and instead of the sheet-metal ring 26 produced as a separate part a sheet-metal ring 26a integrally formed on the outer layer 12a is used and this has been produced by folding the sheet metal of the outer layer 12a around the combustion chamber aperture 18a.

The embodiments according to FIGS. 1 and 2 do, however, have in common that in accordance with the invention the sheet-metal ring 26 and 26a, respectively, is located on the inner side of the adjacent outer layer 12 and 12a, respectively, so that the main surfaces of the gasket plate 10 and 10a, respectively, are also flat and smooth around the combustion chamber aperture.

In the embodiment according to FIG. 2, the semi-bead 38a surrounding the fluid aperture 20a is designed to be bent at an angle downwards when seen from the fluid aperture whereas in the embodiment according to FIG. 1 the semi-bead 38 (in cross section) points upwards at an angle.

Figure 3:
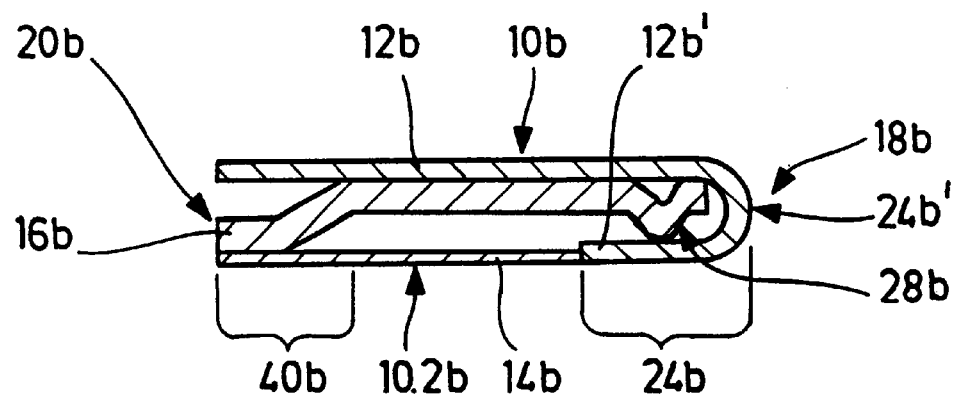

The embodiment illustrated in FIG. 3 differs from the two embodiments described above essentially due to the fact that for generating a so-called combustion chamber superelevation, i.e. for increasing pressure in the region of the combustion gas sealing system, outer layers of different material thicknesses have been used instead of a sheet-metal ring and the outer layer having a greater material thickness has been folded around the combustion chamber aperture such that a combustion chamber border approximately C-shaped in cross section results with a free edge strip which effects the desired increase in pressure. In the embodiment illustrated in FIG. 3, the outer layer 12b has a greater material thickness than the outer layer 14b and is folded through 180° around the combustion chamber aperture 18b, thereby forming a combustion chamber border 24b', such that it forms a free edge strip 12b' which is part of the combustion chamber sealing system 24b and covers the full bead 28b of the inner layer 16b. In accordance with the invention, the free edge strip 12b' does not, however, overlap the other outer layer 14b and so the lower main surface 10.2b of the gasket plate 10b according to FIG. 3 is flat in the vicinity of the combustion chamber aperture 18b.

Figure 4:
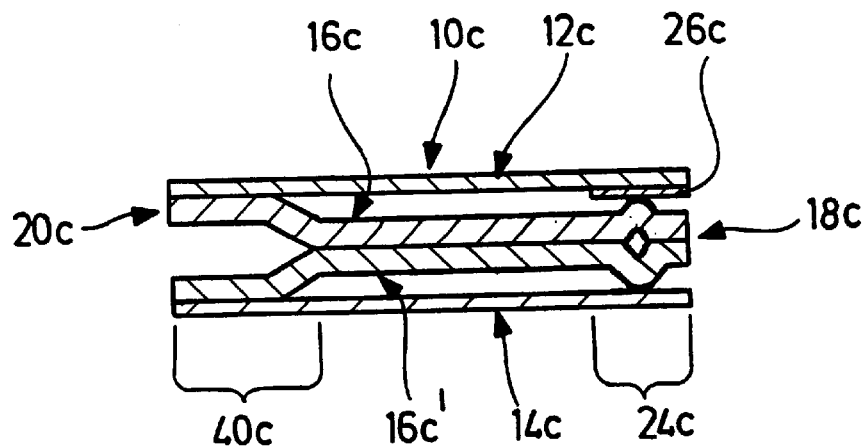

The embodiment illustrated in FIG. 4 differs from that according to FIG. 1 essentially only due to the fact that two inner layers 16c and 16c' provided with beads replace the inner layer 16 of the embodiment according to FIG. 1; these two inner layers are preferably designed and arranged in mirror symmetry with respect to a center plane of the gasket plate 10c. Areas of contact of the full and the semi-beads corresponding to one another extend, in particular, such that they are congruent in a plan view of the gasket plate 10c.

Figure 5:
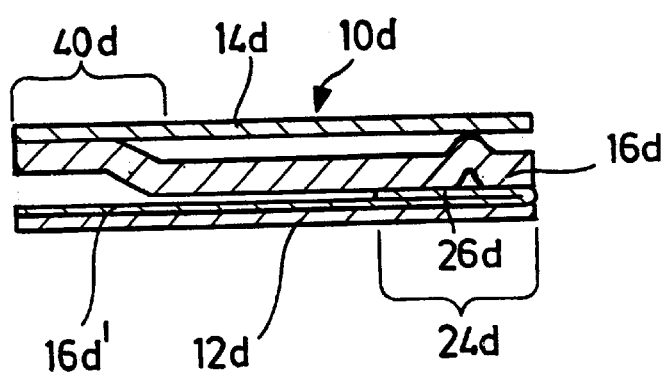

The embodiment according to FIG. 5 is very similar to the embodiment according to FIG. 2 but it does have one metal layer more than the embodiment according to FIG. 2, and the so-called combustion chamber superelevation is brought about by a folded area of a second inner layer. In the embodiment illustrated in FIG. 5, both outer layers 12d and 14d are smooth sheet-metal layers without any folded region whereas a second inner layer 16d' with a folded region forms a sheet-metal ring 26d which is part of the combustion gas sealing system 24d; as for the rest, the second inner layer 16d' is, however, a simple, smooth and flat sheet-metal layer.

Figure 6:
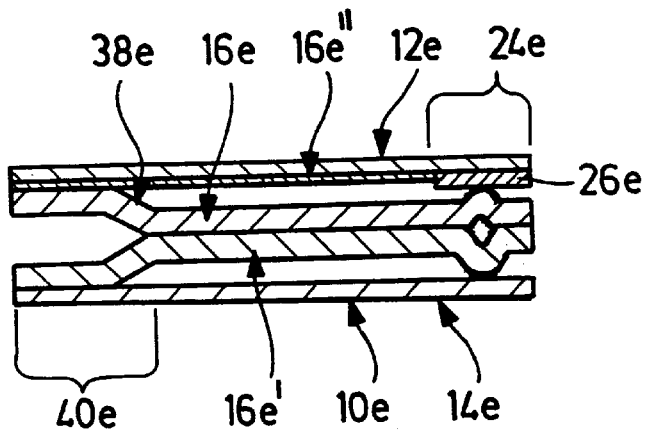

The embodiment illustrated in FIG. 6 is identical to the embodiment shown in FIG. 4, except for an additional inner layer; this additional, third inner layer is a smooth, flat inner layer 16e'' which, preferably, does not extend into the combustion gas sealing system 24e but against which the semi-bead 38e of the inner layer 16e is supported.

As is shown in the embodiments illustrated in the drawings, it is particularly advantageous to provide the semi-beads of the fluid sealing systems on the same inner layers as the beads of the combustion gas sealing systems in order to be able to use smooth metal sheets for as many metal layers of the gasket plate as possible. In principle, it would, of course, also be possible to provide the semi-beads of the fluid sealing systems on a different inner layer to the beads of the combustion gas sealing systems.

What is claimed is:

1. Cylinder head gasket with a gasket plate having two outer main surfaces and several metal layers placed on top of one another, said gasket plate having at least one combustion chamber aperture as well as at least one fluid aperture and being provided with a combustion gas sealing system around the combustion chamber aperture as well as with a fluid sealing system around the fluid aperture, wherein two outer metal layers of the gasket plate enclose between them at least one inner metal layer of the gasket plate, said inner layer having (i) a first bead being part of the combustion gas sealing system and surrounding the combustion chamber aperture, as well as (ii) a second bead neighbouring and surrounding the fluid aperture and being part of the fluid sealing system, said first bead being a full-bead approximately U-shaped in cross section and having a crest, said second bead being a semi-bead with an approximately Z-shaped cross section, said first and second bead being elastically deformable in an elastic range of deformation of said inner layer and being supported against metal layers of said gasket plate neighbouring said inner layer when the gasket is fitted, and said outer layers covering said first and second bead being designed over the two entire outer main surfaces of the gasket plate as smooth and flat sheet metal layers so as to make said outer main surfaces smooth and flat, wherein (a) said inner layer is such a spring-steel sheet metal layer that said beads are stressed predominantly in said elastic range when the gasket is fitted;

(b) said first bead is neighbouring said combustion chamber aperture, and (c) in order to increase sealing pressure at the combustion gas sealing system, the sum of the material thickness of the metal layers of the gasket plate around the combustion chamber aperture is greater in an annular area of the combustion gas sealing system neighbouring the combustion chamber aperture than in areas of the gasket plate bordering on the combustion gas sealing system, said annular area of the combustion gas sealing system comprising said first bead inclusive of the crest thereof.

2. Cylinder head gasket as defined in claim 1, wherein said second bead of the inner layer is supported against at least one of the two outer layers.

3. Cylinder head gasket as defined in claim 1, wherein the two outer layers are provided with a coating over the entire surface on at least one of the sides of said outer layers.

4. Cylinder head gasket as defined in claim 3, wherein the two outer layers are provided with a coating on both sides over the entire surface.

5. Cylinder head gasket as defined in claim 3, wherein the two outer layers are provided with a coating over the entire surface on the outer sides of the outer layers forming said outer main surfaces of the gasket plate.

6. Cylinder head gasket as defined in claim 1, wherein at least one of the two outer layers has a lesser hardness than said inner layer provided with said beads.

7. Cylinder head gasket as defined in claim 1, wherein the material thickness of a first one of said outer layers is greater than that of the other, second outer layer and wherein in order to form a border of the combustion chamber aperture approximately C-shaped in cross section the first outer layer is folded through 180° around the combustion chamber aperture such that a free edge strip of the folded region is located at least approximately in the plane of the second outer layer and extends at least over said crest of the second bead.

8. Cylinder head gasket as defined in claim 1, wherein the combustion gas sealing system has a sheet-metal ring covering at least said crest of the first bead and surrounding the combustion chamber aperture, said ring being borne by one of the metal layers.

9. Cylinder head gasket as defined in claim 8, wherein said sheet-metal ring is borne by one of said outer layers and extends adjacent to the inner side of said outer layer and parallel thereto.

10. Cylinder head gasket as defined in claim 8, wherein for forming the sheet-metal ring the metal layer bearing said ring is folded back upon itself through 180° around the combustion chamber aperture.

\* \* \* \* \*